(12) United States Patent
Baum et al.

(10) Patent No.: US 7,103,583 B1
(45) Date of Patent: Sep. 5, 2006

(54) METHOD FOR DATA INPUT INTO A SERVICE DEVICE AND ARRANGEMENT FOR THE IMPLEMENTATION OF THE METHOD

(75) Inventors: Volker Baum, Berlin (DE); Georg G. Gelfer, Glen Ellyn, IL (US); Werner Kampert, Hamburg (DE); Henrik Koschitzki, Berlin (DE)

(73) Assignee: Francotyp-Postalia AG & Co., (DE)

( * ) Notice: Subject to any disclaimer, the term of this patent is extended or adjusted under 35 U.S.C. 154(b) by 0 days.

(21) Appl. No.: 09/394,840

(22) Filed: Sep. 13, 1999

(30) Foreign Application Priority Data

Sep. 11, 1998 (DE) ................................ 198 43 249

(51) Int. Cl.
*G06F 17/60* (2006.01)
(52) U.S. Cl. .................... 705/409; 705/50; 705/400; 705/401
(58) Field of Classification Search ................ 705/400, 705/22, 1, 401, 409, 50
See application file for complete search history.

(56) References Cited

U.S. PATENT DOCUMENTS

| | | | | |
|---|---|---|---|---|
| 3,815,103 A * | 6/1974 | Holtey et al. | .................. | 714/42 |
| 4,097,923 A * | 6/1978 | Eckert et al. | ................ | 705/410 |
| 4,122,532 A * | 10/1978 | Dlugos et al. | .............. | 705/409 |
| 4,138,735 A | 2/1979 | Allocca et al. | ............. | 705/409 |
| 4,442,501 A | 4/1984 | Eckert, Jr. et al. | .......... | 705/405 |
| 4,752,950 A * | 6/1988 | Le Carpentier | ............. | 379/106 |
| 4,812,965 A | 3/1989 | Taylor | ........................ | 705/401 |
| 5,008,827 A * | 4/1991 | Sansone et al. | ............. | 705/409 |
| 5,161,109 A | 11/1992 | Keating et al. | ............. | 705/410 |
| 5,274,762 A * | 12/1993 | Peterson et al. | ............ | 709/219 |
| 5,448,641 A | 9/1995 | Pintsov et al. | ................ | 380/51 |
| 5,448,698 A * | 9/1995 | Wilkes | ........................ | 709/245 |
| 5,490,077 A | 2/1996 | Freytag | ....................... | 705/405 |
| 5,588,148 A * | 12/1996 | Landis et al. | ................... | 707/1 |
| 5,606,508 A | 2/1997 | Thiel | ........................... | 705/410 |
| 5,710,706 A * | 1/1998 | Markl et al. | ................. | 705/409 |

(Continued)

FOREIGN PATENT DOCUMENTS

DE      OS 38 23 719      1/1989

(Continued)

OTHER PUBLICATIONS

"Technology's stamp is on the mailroom"-Patricia M. Fernberg, Modern Office Technology, v31, p38☐☐.*

*Primary Examiner*—Calvin L. Hewitt, II
(74) *Attorney, Agent, or Firm*—Schiff Hardin LLP

(57) ABSTRACT

A method and apparatus for data input into a service device allow a loading and updating of service data, particularly postage fee schedule tables, separated from one another in time. The method and apparatus are suitable for postage meter machines as well as for scales containing postage computers or similar devices. The apparatus for implementation of the method contains a processor and a memory with memory areas for service data. After detecting the input and storage of a load requirement, a check for the presence of a load instruction, formation of a status report of the memory occupancy for service data and a transmission of the status report to the data center ensue. The data center forms recommendations for a future status of the memory occupancy in the service device on the basis of an analysis of the status report of the memory occupancy for service data that is implemented in the data center. The data center transmits the recommendations to the service device that, after evaluation thereof, sends corresponding request data before the actual loading.

20 Claims, 4 Drawing Sheets

U.S. PATENT DOCUMENTS

| | | | |
|---|---|---|---|
| 5,715,164 A * | 2/1998 | Liechti et al. | 364/464.2 |
| 5,737,426 A * | 4/1998 | Brookner et al. | 380/51 |
| 5,743,662 A * | 4/1998 | Abumehdi et al. | 400/62 |
| 5,745,887 A * | 4/1998 | Gargiulo et al. | 705/410 |
| 5,805,711 A | 9/1998 | Windel et al. | 380/55 |
| 5,875,430 A * | 2/1999 | Koether | 705/1 |
| 5,943,657 A * | 8/1999 | Freestone et al. | 705/400 |
| 6,041,319 A * | 3/2000 | Bass et al. | 705/409 |
| 6,108,534 A * | 8/2000 | Bourgeois et al. | 455/419 |
| 6,463,133 B1 * | 10/2002 | Dlugos et al. | 379/93.11 |

FOREIGN PATENT DOCUMENTS

| | | | |
|---|---|---|---|
| EP | 137737 A2 * | 4/1985 | |
| EP | 0 780 803 | 6/1997 | |
| FR | 2655003 | 1/1992 | |

* cited by examiner

METHOD FOR DATA INPUT INTO A SERVICE DEVICE AND ARRANGEMENT FOR THE IMPLEMENTATION OF THE METHOD

BACKGROUND OF THE INVENTION

1. Field of the Invention

The present invention is directed to a method and apparatus for data input into a service device of a type which are convertible to enter different service data in a service device, particularly a new postage fee schedule table in a postage computer. The method and apparatus are suitable for postage meter machines as well as for scales containing postage computers, or similar devices containing postage computers.

2. Description of the Prior Art

German PS 38 23 719 and U.S. Pat. No. 4,138,735 disclose reloading a fee schedule table for postage fees initiated by a remote data center at specific points in time. When the data exchange is initiated by the server of the data center, the postage meter machine must remain constantly connected which is disadvantageous.

U.S. Pat. No. 5,490,077 and U.S. Pat. No. 5,606,508 disclose proposed initiating the data loading from the postage meter machine on demand, whereby the data base is updated after the activation of the postage meter machine dependent on conditions (such as, for example, name, date). In order to equip the majority of postal customers with a fee schedule table in advance of its effective date, this fee schedule is stored in a memory of a transmission means (chip card or cell of a GSM network) separate from the postage meter machine long before it takes effect. When the postage meter machine is turned on, the date of the calendar module of the postage meter machine is employed, or is operated on with further conditions that are entered, in order to select the table, and the table is thereupon loaded into the memory of the postage meter machine when the machine is placed into operation. An updating of the previous table ensues when loading from a memory of the transmission medium into the memory of the postage meter machine.

U.S. Pat. No. 5,710,706 corresponding to European Application 724 141 discloses a scale that is connected by an interface to a postage meter machine in order to update fee schedule table data. The loading of the update data ensues from a remote data center by modem to the postage meter machine. The loading and updating ensue in immediate succession. When a message is present that fee schedule table data are to be updated, a loading ensues. The update data or new fee schedule can be intermediately stored in the postage meter machine and a sector-by-sector deletion of the old postage fee schedule table in the non-volatile memory of the scale can take place before the transfer of the new fee schedule table data from the intermediate memory of the postage meter machine to the scale, and the write-in of the new fee schedule table data in the non-volatile memory of the scale. A number of tables can be stored in the scale, however, each table refers to a separate mail carrier that can be selected via keyboard. The minimum validity date of a fee schedule table allocated to a carrier identification number CIN is stored and is interpreted by the postage meter machine in order, as needed, to form request data, to load new fee schedule table data, or to update the data in the memory of the scale according to the CIN. If, however, the minimum validity date is also the conversion date from an old to a new fee schedule table, then a backlog of communications ensues at the data center when multiple postage meter machines wish to communicate with this data center on the same day.

U.S. Pat. No. 5,448,641 discloses a postal fee system wherein a validity check is made in the terminal equipment at the user side. The postage fee schedule table is transmitted from the data center to the terminal equipment. A code belonging to the postage fee schedule table is also transmitted from the data center to the terminal equipment. The terminal equipment generates a comparison code from a message based on the received postage fee schedule table. On the basis of the comparison of the received code to the generated comparison code, the validity of the received postage fee schedule table can be checked in the terminal equipment. The terminal equipment thus can verify the communicated postage fee schedule table. For reducing the communication backlog with the data center when multiple postage meter machines wish to communicate with this data center on the same day, a very high number of modems would have to be utilized, thereby increasing the outlay at the data center. Communication problems also occur due to the backlog, which lead to a lengthening of the conversion process to the new postage fee schedule table for a number of devices. During this time, the users cannot operate the affected devices for mail processing.

European Application 780 803 discloses a method and arrangement for data input into a postage meter machine. A data center communicates a message on behalf of a mail carrier (carrier info) that includes an "I have something for you" message. When, due to a communicated carrier info, the user then actuates an input key, a loading event sequences fully automatically. In this procedure, however, it is difficult to predict at the postage meter machine side whether the communicated data may contain so many bits that problems involving memory space result.

A data set is periodically interrogated by the central station in the system disclosed in U.S. Pat. No. 5,161,109 corresponding to European Application 373 971 and a report to communicated from the postage meter machine to the central station. A standard data bank serves the purpose of storing data. These data also include fee schedule data. The communicated report is reworked in the data center and an updated data set is sent back to the postage meter machine (downloading). This is not possible, however, without further difficulty in conjunction with on-demand loading of postage fee schedules. If a number of load requests are simultaneously received at the data center, a jam or a long communication duration can result because the complete table may have a large bit content under certain circumstances, thereby occupying data processing capacity and memory space at both communication partners.

SUMMARY OF THE INVENTION

An object of the present invention is to provide a method for data input into a service device in order to shorten the conversion process to enter other service data. Another object is to provide a suitable arrangement for fully automatic implementation of the method. The method and apparatus should allow a postage computer to use a fee schedule table substantially contemporaneously with the communication of a new postage fee schedule table from the mail carrier to a data center. The method and apparatus also should allow a postage fee schedule table to be communicated on demand to the service device in order to be able to load this into corresponding memories of the postage computer. The method should be usable by different service devices to enable a short conversion process onto a new postage fee schedule table independently of the device type.

The above objects are achieved in accordance with the principles of the present invention in a method and apparatus for data input into a service device wherein service data are loaded on demand in a communication between the service device and a data center remote therefrom, wherein the service device formulates a status report identifying current memory occupancy of service data and transmits the status report to the data center, wherein the data center formulates recommendations for a future memory occupancy state in the service device dependent on the service data at the data center which will be transmitted to the service device, and these recommendations are transmitted in a message from the data center to the service device, and wherein the service device, upon receipt of the message, checks the recommendations therein for feasibility in the service device, and wherein the service data are subsequently transmitted from the data center to the service device and loaded therein according to one of the recommendations.

The inventive method for data input into a service device contains steps that, in particular, allow a less problematical loading for a number of different service data sets. The data center checks the hardware and software boundary conditions before a loading procedure, including the occupation of memory space in the service device, without checking or processing the service data set itself. The analysis in the data center ends with the communication of memory recommendations to the service device.

The service device preferably contains a trigger arrangement for triggering the loading, a processor, and a memory for storing service data (for example, postage fee schedule data). The service device processor is programmed in accordance with the invention to form a status report of the memory occupation for service data;

to communicate with transmission of the status report of the memory occupation to the data center and receive a message from the data center that contains recommendations; and to check recommendations for a future status of the memory occupancy due to the analysis of the status reports of the memory occupancy implemented by the data center for service data; as well as to load new service data into said memory.

In the service device, the processor monitors the input of a load instruction, evaluates the feasibility thereof in the service data memory when checking the received recommendations, and selects free memory areas according to one of the checked recommendations. The recommendations are automatically followed, unless a fault occurs, in which case an alternative recommendation may be followed. The service data are either compressed or non-compressed when loading. When loading new service data, an appertaining conversion date is also loaded into the service data memory.

The processor is programmed for a number of service data sets, for checking the stored conversion date on the basis of the current date. A further-processing with the old service data ensues when the current date precedes the conversion date. When the conversion date is after the current date or given equality thereof, an instruction to update the service data ensues, whereby the service device implements a data write-in, with decompression of the data if necessary, for updating the service data.

For loading and updating service data in the service device, the method for data input into a service device includes the steps of:

a) offering at least first and second memory areas in the service device for each service vendor (carrier), the first memory area being provided for new service data which will be valid in the future beginning with a conversion date, and the second memory area being provided for currently valid service data;

b) checking in the service device for input of a load instruction, with a communication with the data center ensuing given the presence of a load instruction;

c) forming a status report of the memory occupancy for service data;

d) communicating with the data center whereby the status report is transmitted to the data center, with transmission and reception of a message having recommendations for a future status of the memory occupancy in the service device, with the transmission of the message from the data central to the service device being preceded by a formation of the recommendations for a future status of the memory occupancy for a number of service vendors on the basis of an analysis of the status report of the memory occupancy for service data implemented by the data center;

e) selecting one of the first free memory areas in the memory of the service device according to the input recommendations in conjunction with checking thereof for feasibility in the memory of the service device;

f) forming corresponding request data and the communication thereof to the data center given feasibility or transmission of an error message given non-feasibility;

g) loading new service data according to the request data into the first memory area and loading an appertaining conversion date into the third memory area; as well as h) automatic updating, independently and chronologically separated from the aforementioned loading, whereby service data from a corresponding, first memory area are written into the second memory area of the service device, so that the actual updating can ensue at an arbitrarily later conversion date.

The service device is, for example, a postage computer and the service data are preferably data of a postage fee schedule table. The postage computer can be integrated in a service device of a mail processing system or can be arranged separately from the service device. The service device is preferably a matter of an electronic postage meter machine or a postage computing scale that can be set to at least one of the mail carriers. The invention is based on the need of some mail carriers to arbitrarily change the service data intended for use. In particular, the service data include the fees in postage fee schedule tables, but are not limited thereto. For simplicity and to avoid repetition, only postage fee schedule tables are mentioned below, but other types of service data are not excluded.

The transmission and storage of a new postage fee schedule table in a postage computer can be implemented on demand or automatically pre-programmed at a first point in time. The actual updating of the postage fee schedule table is automatically implemented beginning at a second point in time. The postage computer can be arranged in one of the devices of a mail processing system. A trigger key for loading is preferably arranged in the same device that contains the postage computer.

Inventively, the memory of the postage computer can store at least two tables for the same mail carrier. The mail carrier is the appertaining postal authority or a private carrier that communicates a message to the user of the mail processing system. One of the two tables is the table which will be valid in the future whose loading was initiated early and subject to a fee by actuating a trigger key. When the data are already loaded before the date of the conversion, the telephone charges can be advantageously reduced. The user selects a correspondingly favorable point in time so that only slight telephone charges are incurred when loading. Since the updating doe not ensue during a communication with the server but independently thereof, the updating can be implemented simultaneously in all systems when these systems have loaded the data into one of their memories in advance and stored the data in non-volatile fashion. This solution requires only slightly more memory space, which is becoming more and more economical, and thus minimizes not only the conversion time but also the required number of modems that must be connected to the server at the same time.

The executive sequences with which an updating of data are triggered sequence automatically. Memory space therefor should be reserved in that device of the system that is intended to store the date for when the table takes effect, or to store a conversion date. The memory location must be interrogated under specific conditions. That device of the system that implements this interrogation also undertakes the check to determine whether the conversion time has been reached.

DESCRIPTION OF THE PREFERRED EMBODIMENTS

Figure 1:
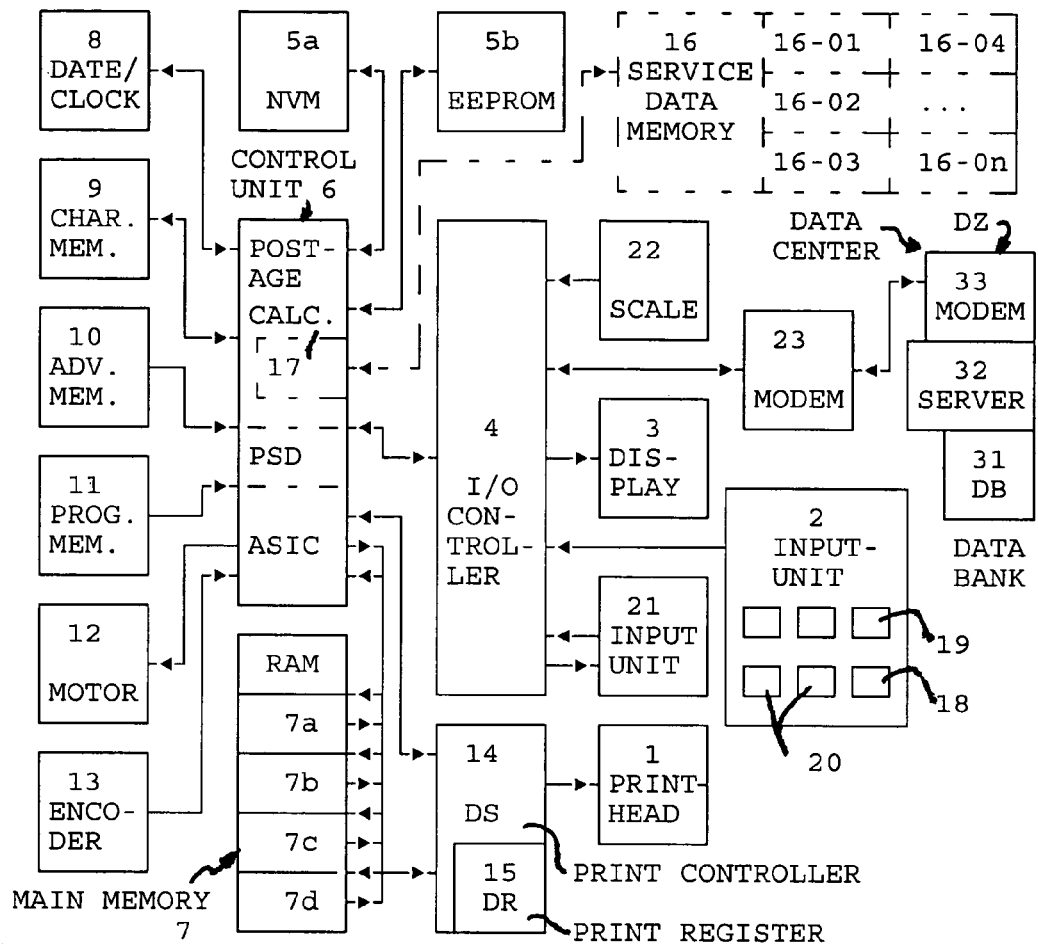
FIG. 1 is a block circuit diagram of a postage meter machine with internal postage computer and a postage fee schedule table memory, the postage computer being programmable and operable in accordance with the invention.

FIG. 1 shows a block circuit diagram of the inventive postage meter machine with a printer module 1 for a fully electronically generated franking image, with at least one input unit 2 having a number of actuation elements (such as a keyboard), a display unit 3, a modem 23 producing communication with a data center. A further input unit 21 or a scale 22 are coupled to a control unit 6 via an input/output control module 4. The postage meter machine contains non-volatile memories 5a, 5b, 9, 10 and 11 (the contents of which are described below), which include the variable and constant parts of the franking format, and/or programs for processing the data in conjunction with the mail carrier or service that the carrier is to provide. In addition to a microprocessor μP, the control unit 6 in further embodiments can also contain a separate postage calculator 17 and further components such as an application-specific integrated circuit ASIC for communication with sensors and actuators of the machine base (see European Application 716 398), a security module SiMo (see European Application 789 333) and other means for improving the data security (see German OS 196 50 993).

Newer postage meter machines utilize a digitally operating printer module 1. For example, thermal transfer printers or ink jet printers were utilized for the first time world-wide in the postage meter machine models T1000 and JetMail of Francotyp-Postalia AG & Co. It is thus possible to print other information or to print these information differently as desired on a filled envelope in the area of the franking imprint, this information having a corresponding relationship to a service of a carrier. It is thus also easily possible to change among private mail carriers and their services. The franking imprint therefore advantageously contains a reference to the carrier and/or the service being used or being planned. The character memory 9 supplies the necessary print data for the variable parts of the franking format to a volatile main memory (RAM) 7. The microprocessor μP of the control unit 6 is in communication with the input/output control module 4, with the character memory 9, with the volatile main memory 7 and with non-volatile main memories 5a, 5b (which contains internal, non-volatile fee schedule memories) or (shown with broken lines) with an additional non-volatile fee schedule memory 16. The microprocessor μP also communicates with a non-volatile main memory 10 and program memory 11, with the motor of a transport or feeder means, which may include a tape dispenser 12 and an encoder (coding disk) 13, as well as with a battery-supported calendar module (clock/date module 8). That memory module that forms the non-volatile main memory 5b can, for example, be an EEPROM that is protected from removal by at least one additional measure, for example by being glued onto the printed circuit board, by being sealed or cast with epoxy resin. Further details regarding individual functions of the security means are provided in German OS 195 34 530.

For example, the storage of the postage fee schedule tables can be realized within the non-volatile memory 5a in that special memory areas that are provided. The postage fee schedule tables can be separately stored in a non-volatile memory 16 (shown with broken lines). The individual memories can be realized physically separated or—in a way that is not shown—combined in a few modules. The fee schedule table which will be valid in the future is stored in the memory area 16-01 accordingly established therefor and the currently valid fee schedule table is correspondingly stored in the separately provided memory area 16-02. The appertaining conversion date is stored in a third area 16-03 of the non-volatile memory 16. Information in a fourth memory area 16-04 for such new postage fee schedule tables available in the data center is, for example, in the form of a carrier-associated order number or version number. The available memory capacity in the non-volatile memory amounts, for example, to 20 kBytes and is optimally used by a spaces-saving memory management. The non-volatile fee schedule memory is preferably a battery-supported C-MOS-RAM module.

The data center DZ has modems 33 that are connected to a server 32 that accesses a data bank 31 when a corresponding request is received. Given on demand actuation of a key of the input unit 2, or by the operation of some other suitable input unit 21 of the postage meter machine, or time-controlled by the calendar module 8 that forms a trigger circuit, a load instruction is generated that triggers the loading of the fee schedule table data. The microprocessor μP can be programmed so that service data that only constitute parts of a table (patches) are loaded from the data center DZ. The microprocessor μP can then communicate the request data by modem 23 via a communication network to the modem 33 of the data center DZ. Alternatively, transmission/reception devices can be utilized in order to communicate request data by radio, or a digital communication network can be used.

Figure 2:
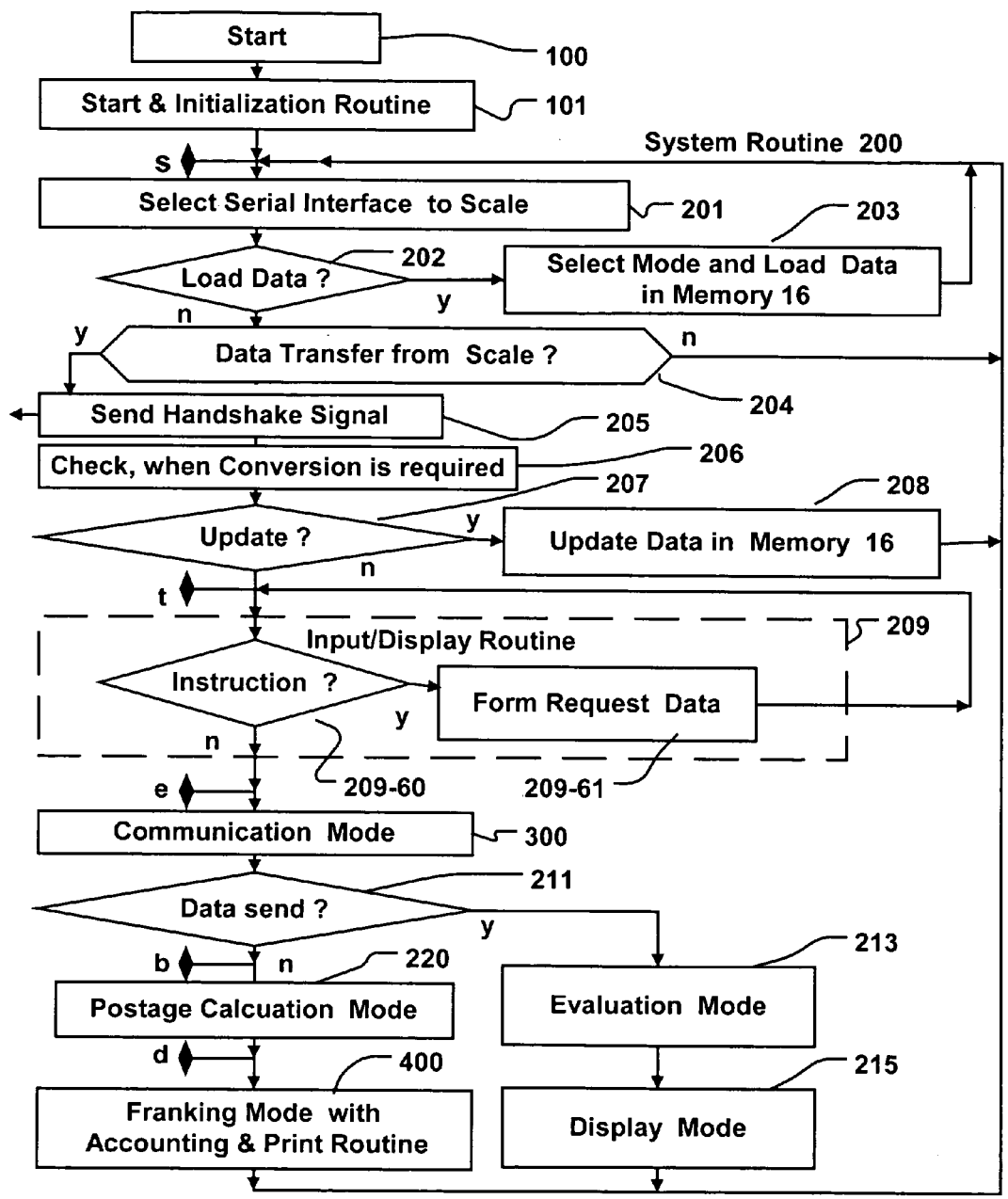
FIG. 2 is a flowchart showing the operation of a postage meter machine according to FIG. 1.

FIG. 2 shows a flowchart for a postage meter machine according to FIG. 1, whereby a loading for a postage meter machine being operated ensues separately from a conversion. After the postage meter machine is turned on in start step 100 and after executing a start and initialization routine 101, such as disclosed in detail in German OS 195 34 530, the point s of the system routine 200 is reached. The postage meter machine has now been placed in operation and is in its normal operating mode that is also called normal mode. In a first step 201, non-volatilely stored input data are called for setting the postage meter machine. If the postage meter machine was set during the initialization routine 101 to collaborate with an activated scale, then a serial interface to the scale is selected in the first step 201 in order to receive at least one communicated weight value. The input unit 2 allows a number of further inputs for modifying the settings. For example, given actuation of a key 19 of the input unit 2, a load instruction is directly entered. Alternatively, a code can be entered with keys 20, this being acknowledged with a key 18 in order to generate a load instruction later (possibly periodically). The input/display routine 209 contains a number of interrogation steps, only a single interrogation step 209-60 thereof being shown. This step 209-60 interrogates for the presence of a load instruction. When such an input is recognized, a branch is made to sub-step 209-61 in order to set a communication requirement flag (E-flag), and then to reset the load instruction. If no (renewed) such input was recognized, a branch is made to the point e, possibly via further interrogation steps. In the communication mode 300, a check is made to determine whether an E-flag was set, and if so an automatically sequencing electronic communication with the data center DZ is triggered.

In the communication mode 300, the requesting postage meter machine identifies itself at the data center DZ with its identification number (ID). If the service device that requires the service data is a separate postage computer, the service device also informs the data center DZ of its identity TYP. The type (table type) of desired service data is likewise communicated ("rate table"). In the framework of a report (status report) about the status of the service data, the version number of the previous postage fee schedule table is communicated. This allows an analysis in the data center DZ as to whether and to what extent operation was hitherto carried out with valid tables. The locating of the new postage fee schedule tables in the data bank DB 31 of the data center DZ is also simplified by having this information. Each postage fee schedule table has a release order number allocated to it, which is compared to that communicated in order to identify the release or order number of the postage fee schedule table to be loaded in the future. A unique name or mark stored, as information in the fourth memory area (16-04) can alternatively identify the new service data. The server 32 is programmed for checking inter alia for a load instruction, as explained in detail below with reference to FIG. 3. The postage fee schedule table data are preferably initially intermediately stored in the memory area 7d of the volatile main memory 7 of the postage meter machine in order to enable a check.

If service data were communicated and intermediately stored in the main memory area 7d as a result of the communication, then this is recognized in the following interrogation step 211 and a branch is made to the evaluation mode 213. It is not only possible in the evaluation mode to check the correctness of the communication and validity of the new service data, but also further checks or statistical acquisitions can be realized. It can be optionally provided to check the updating requirement of service data in the evaluation mode and to update the service data if necessary. The result of this check is displayed in the display mode 215 before a branch is made back to the point s of the system routine. When the result of this check was positive, for example, a U-flag for mode switching is set for a following updating. In the interrogation step 202, a check can be made, for example with reference to the set U-flag, as to whether service data are to be loaded into the non-volatile memory 16. In step 203, a number of sub-steps then ensue for mode switching and for loading the service data into the non-volatile memory 16. The U-flag for mode switching is then in turn reset in a terminating sub-step before a branch is made back to point s of the system routine.

If, however, the result of this check was negative, then a branch is made to the next step, for example to the interrogation step 204. In the interrogation step 204, an inquiry is made as to whether a data transmission ensued from the scale 22. If no weight value from the scale 22 is identified and transmitted to the postage meter machine, then this is determined in interrogation step 204 and a branch is then made back to point s of the system routine 200. The postage meter machine thus waits for an input from the scale 22. When this input ensues, a handshake signal is sent to the scale 22 in the step 205 and a branch is then made to step 206 in order to check whether a conversion is required, particularly on the basis of a stored conversion date and the current date in step 207. Given a requirement for a conversion, a branch is made to step 208 in order to implement an updating of the service data in the memory areas of the non-volatile memory 16. A branch is then made back to the point s of the system routine. Otherwise, the point t of the system routine 200 is reached. The input/display routine 209 contains a number of interrogation steps, each thereof being individually interrogated. The aforementioned German OS 195 34 530 discloses further interrogation steps. If no further inputs are present, the step 300 is executed without communication. When no further data were communicated, this being identified via the interrogation step 211, the point b of the system routine 200 is reached.

The aforementioned German OS 195 34 530 discloses a number of steps that can be executed between the points b and d of the system routine 200 before a branch is made to the franking mode 400. In a known way, one of the steps in the present exemplary embodiment is a postage calculating mode 220. The following franking mode 400 contains known debiting and printing routine. After the printing of a franking imprint, a branch is made back to the point s of the system routine 200.

As the postage computer, the microprocessor μP is programed both for loading and updating fee schedule table data by a program stored in the program memory 11. The program memory 11 is implemented as a read-only memory ROM. The microprocessor μP is programmed for checking the stored conversion date of the postage meter machine on the basis of the current date stored in the clock/date module 8 and for processing using the old (current) postage fee schedule tables when the current date falls short of the conversion date or, otherwise, for communicating an instruction to implement the conversion.

Alternatively, the control unit 6 can contain a separate (dedicated) postage calculator 17 for calculating postage, forming a postage computer together with the memory 16. The microprocessor μP is programmed to check the stored conversion date in the postage meter machine on the basis of the current date. The postage calculator 17 is programmed to continue processing with the old postage fee schedule data when the current date falls short of the conversion date. The microprocessor µP is programmed to communicate an instruction to the postage calculator 17 to update the postage fee schedule table data when the current date is equal to or exceeds the conversion date.

In one embodiment, the postage meter machine is set to a specific city and to a specific loading date upon initialization. These settings can be stored in the non-volatile memory 5a or 16 in separate memory areas 16-05, 16-06. Together with the keyboard 2 and the calendar module 8, the microprocessor µP forms a trigger circuit that can output a load instruction in order to trigger a pre-programmed loading at a first point in time (loading mode). The loading date stored in the memory area 16-06 is interrogated in the interrogation step 202. Assuming that the postage meter machine is not previously shut off, service data are loaded at the programmed, first point in time, for example after midnight when telephone rates are less expensive.

A stored conversion date is also present in the separate memory area 16-03. The actual conversion of service data thus can ensue automatically at a second point in time in the operating mode of the postage meter machine. The second point in time for the conversion is prescribed by the mail carrier and is loaded into the third memory area 16-03 during the loading procedure. When the current date is equal to or exceeds the conversion date, the postage computer is programmed to update the postage fee schedule table. The postage computer thereby implements a deletion of the old service data and, if necessary, conducts a decompression of the new data before writing the new data into the second memory area 16-02 during the updating of the postage fee schedule table data.

The flowchart of the communication mode for a service device and the corresponding executive sequences in the data center are explained with reference to FIG. 3. The service device is started in step 100 and a number of steps are processed, these already having been explained with reference to FIG. 2. During the framework of an input routine 209, a check ensues as to the presence of a load instruction in order to start a communication on demand. The communication in the communication mode 300 comprises at least a first transaction and a second transaction, which entail a number of sub-steps.

The first transaction 320 begins with the communication of the identification ID of the service device in a first commencement sub-step. The ID is, for example, the postage meter machine serial number. Optionally with the ID, the machine type of the calling service device, the ISO country code, a service ID and a release of the transmission protocol can be communicated. The service ID describes the domain of the requested service, for example postage fee schedule table, or slogan and/or cryptolink reloading service. The release information, designated RELEASE, describes the current technical status of the transmission protocol. In a second commencement sub-step, at least the type of the transmission is communicated in order to make it clear what service data are to be loaded. Further, specific messages can be communicated in addition to the type of transaction: type and ID of the destination machine that uses the service data, for example whether it is a postage computer or a postage-calculating scale. A description of the service software of the destination machine and the capabilities thereof with respect to the loading optionally ensue.

The microprocessor µP of the service device forms the aforementioned status report during the first transaction. Corresponding to a program stored in the program memory 11, a list having a table of contents of the memory occupancy is produced corresponding to the requirements for the service device. In particular, it is possible for the service device to store the postage fee schedule tables in compressed form in a memory area and to retrieve and decompress (expand) each table only when needed. Alternatively, postage fee schedule tables can be stored already expanded or stored in INTEL-HEX format. In addition to information that describe the size of the available memory capacity, the total number of existing memory areas for the corresponding service, the data formats and patches (INTEL-HEX format) and memory size of the service data, also brief descriptions of the service data, or particulars about the content are described in this table of contents. Each postage fee schedule table of a carrier has a carrier name, or a carrier ID, as a part thereof and has a version number, a revision number and a validity date. The latter identifies the validity beginning with a predetermined date. The combination of version and revision number is referred to as the release. In a third sub-step of the first transaction 320 the aforementioned forming and sending of the status report STATUS to a specific server 32 of the data center takes place. In a sub-step of the step 420 and with a survey of the new service data offered by at least one of the carriers in step 410, the server 32 implements an analysis of the communicated status report and forms recommendations as a result of the analysis. For each stored service table, the type thereof, the ID of the table memory and the recommended operation are communicated, for example the recommendation may be that the appertaining table is valid and should be retained. Alternative operations are a replacement of individual table sections or service data by patches, a deletion without replacement or, if a replacement is needed, changing the table.

As an analysis result having only a few bytes and/or in the form of an amended list of possible modifications, the recommendations are communicated to the service device in a message designated MESSAGE. The form of the list is retained in the latter instance, however, it can differ in form at different service devices. The list only contains particulars for possible memory occupancy with current service data and service data taking effect in the future but does not contain the service data set itself, this being communicated only latter in a following, second transaction 330, 430.

Figure 6:
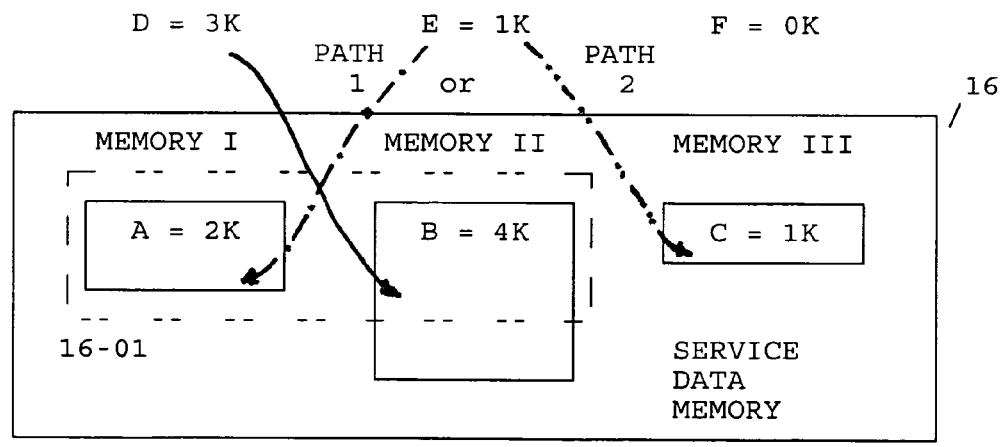
FIG. 6 illustrates a service data memory with free memory locations in accordance with the invention.

A simple example for a service device is explained with reference to FIG. 6, which shows a service data memory with free memory locations. The status report is a message from the service device about, for example, three memory modules I, II, III and the memory occupancy or, respectively, about memory locations A=2K, B=4K, C=1K that are still free. A first memory area 16-01 can be defined as proceeding beyond a memory module I or II. The server has data blocks having the size D=3K, E=1 K, F=0K for new service data. The status report from the service device arrives and is analyzed in the server.

A<D, A>E, A>F;

B>D, B>E, B>F;

C<D, C<E, C>F.

Due to B>D>A, C, there is only a single possibility for a data block D, namely to load it into the memory location B that is still free. For logic reasons, the analysis in the present example yields two further recommendations (path 1, path 2) for the service device:

Path 1: load data block E into memory module I, erase memory module III;

Path 2: load data block E into memory module III, erase memory module I.

Although a memory area of the same size as required for data block E is present for C, it can be most meaningful according to the further recommendation for a specific device type to load the data block E into the memory module I that has more free memory capacity. Since the memory module III contains non-current data sets that will soon no longer be required, the service device can erase these sets. The content of the recommendations is dependent on the nature and currentness of the service data and on the device type of the service device. The following recommendations for the service device are also possible for other service data when the access to old data that are still current should be maintained in memory module I or III:

1. Load data block D into memory module II, load data block E into memory module I, do not erase memory module III;
2. Load data block D into memory II, load data block E into memory III, do not erase memory I.

For a case wherein no current data are to be loaded it is also possible that corresponding recommendations are communicated to the service device. Usually, however, there are modifications when the loading is initiated, so that the recommendations cover a number of proposals.

The list of possible modifications covers a number of proposals, whereby the most meaningful proposal is listed first in conformity with the invention. Type, format, number of bytes to be transmitted, size of the data file after expansion or after the patch, a description of the new table or service data by RELEASE, and ID of the destination memory for the table or, respectively, service data are indicated for every proposal. When the modification of the table was initiated by the carrier, the previous version number is incremented for the new table. The revision number is always incremented when an amendment of an already released table is required for internal reasons (for example, bug fix). The RELEASE information is a component of the postage fee schedule table. If service data were correspondingly offered in the first step 410, the new table must be taken into consideration when forming the recommendations for a postage fee table loading if the user is to make use of the service of the appertaining mail carrier. If a service device has a number of releases of a table stored, the validity date thereof preceding the current date, then the table having the highest release number must be employed. Tables having lower release numbers therefore can be erased. The postage tables can be present in various formats from which the number of bytes to be transmitted, or the data file size, are determined, the service device being informed thereof.

In a fourth sub-step of the first transaction 320, the communicated recommendations are received and interpreted in the service device in order to make a corresponding memory area available, or in order to select a free memory area. During the evaluation in the aforementioned fourth sub-step, a selection of one of the recommended tables occurs in the service device (client). For the following download section, the client requires the description of a table (or tables), that the server is to send in the second transaction.

The following scenarios are possible:

1. The client selects from the recommendations received in the previous section.

Different service devices are thereby possible as client, i.e. those that make a user input necessary or wherein the selection ensues automatically.

2. The client wishes to re-assume an aborted download, i.e. the client knows what table was loaded when the abort ensued and knows what part of the data already loaded are valid and knows the offset for the re-assumption of loading.

3. The client explicitly requests a table (interaction with the user necessary).

In the following, second transaction 330, request data are first formed which identify the desired service data. In particular, the table type and the table description are communicated as request data for postage fee schedule tables. Optionally, a message "offset" is communicated for continuing an interrupted communication, being communicated as 4 byte value. Since there is no interruption at the start, the offset value is zero.

For example, 116 bytes are thus required for a transmission of table request data in the USA:

| Table Type | 1 | Rate Table | 2 |
|---|---|---|---|
| Table Descr: | | | |
| Carrier ID | "USPS\0" | | 32 |
| CarrierServiceID | "\0" | | 32 |
| Release | 0X0400 | 4.0 | 4 |
| ValidForm | 09021998 | Sep. 2, 1998 | 8 |
| VendorID | "Transcell\0" | | 32 |
| Properties | 0 | 0 | 2 |
| offset | 0 | | 4 |
| Total = | | | 116 Byte |

Alternatively for request data identified in this way, some other service device can also transmit an order number for a table with service data when a unique order number is allocated to each table.

Similar to that described above, the second transaction 330 always begins with the communication of the identification of the service data that are to be loaded. The communication ensues to the data center whose server 32, following the start 400 in a first step 410, offers service data and, in the second step 420, specifically replies to the first transaction with a corresponding ACK signal when the identification number ID of the service device is listed in the data bank 31 as not being blocked. Otherwise, a NACK signal is communicated to the service device. The service device is, for example, a postage meter machine according to FIG. 1 and the type of service data is a postage fee schedule table "rate table". At the service device, the communicated reply is received in the second sub-step of the first transaction 320. If a NACK signal is received, the communication is aborted. When an ACK signal is received, a status report of the memory occupancy is formed at the service device (client) and the communication is then continued.

In sub-step of the step 430, the server thus receives this request and, in a sub-step, sends the requested service data to the service device. The service device receives and stores the service data communicated during the data transfer in a second sub-step of the step 330. After every data transfer, the microprocessor μP determines whether all requested service data were completely communicated or whether a re-assumption or continuation of the communication with further transactions is required. When, however, it is found following the data transfer—as shown in step 211 of FIG. 2—that all requested service data have been communicated, then the point a is reached. The embodiment of the method for data input into a postage computer includes the following steps:

a) offering at least one first memory area 16-01 and second memory area 16-02 in the service device per service vendor, the first memory area 16-01 being provided for new service data which will be valid in the future beginning with the conversion date and the second memory area 16-02 being provided for previously valid service data;

b) checking in step 209-60 in the service device for input of a load instruction, with a communication with the data center ensuing given the presence of a load instruction;

c) forming a status report in step 320-3 of the memory occupancy for service data;

d) communication with transmission of the status report to the data center DZ, with transmission and reception of a message from the data center to the service device containing recommendations for a future status of the memory occupancy in the service device, the transmission of the message from the data center to the service device being preceded by a formation of recommendations in step-420-2 for a future status of the memory occupancy for a number of service vendors on the basis of an analysis of the status report of the memory occupancy for service data that is carried out by the data center;

e) selecting a free, first memory areas 16-01 in the memory of the service device according to the input recommendations in conjunction with checking 320-4 the memory of the service device in step 320-4 for feasibility;

f) formation 330-1 corresponding request data in step 330-1 and transmitting the request data to the data center DZ given feasibility of the storing, and transmitting an error message given non-feasibility;

g) loading new service data in step 330-2 according to the communicated request data into the first memory area 16-01 and loading a conversion date; and h) automatically updating in step 213, independently of and separated in time from the aforementioned loading, whereby service data from the corresponding, first memory area 16-01 are written into the second memory area 16-02 of the service device, whereby this updating can ensue at an arbitrary, later conversion date.

During checking, the service device evaluates the recommendations in order to assure that adequate memory space is available. In conjunction with checking in step 320-4 recommendations for feasibility in the memory of the service device, service data that are no longer valid can be erased in the memory and service data that will be valid in the future, or that are already valid, are requested in the sequence of their recommendation.

The loading ensues for the service data identified by a corresponding entry for table type in the table that was presented above. The entry "table type" provides the possibility of loading service data of a completely different type that, however, are likewise components of the load system. The tables also can differ according to the type of service data.

Figure 3:
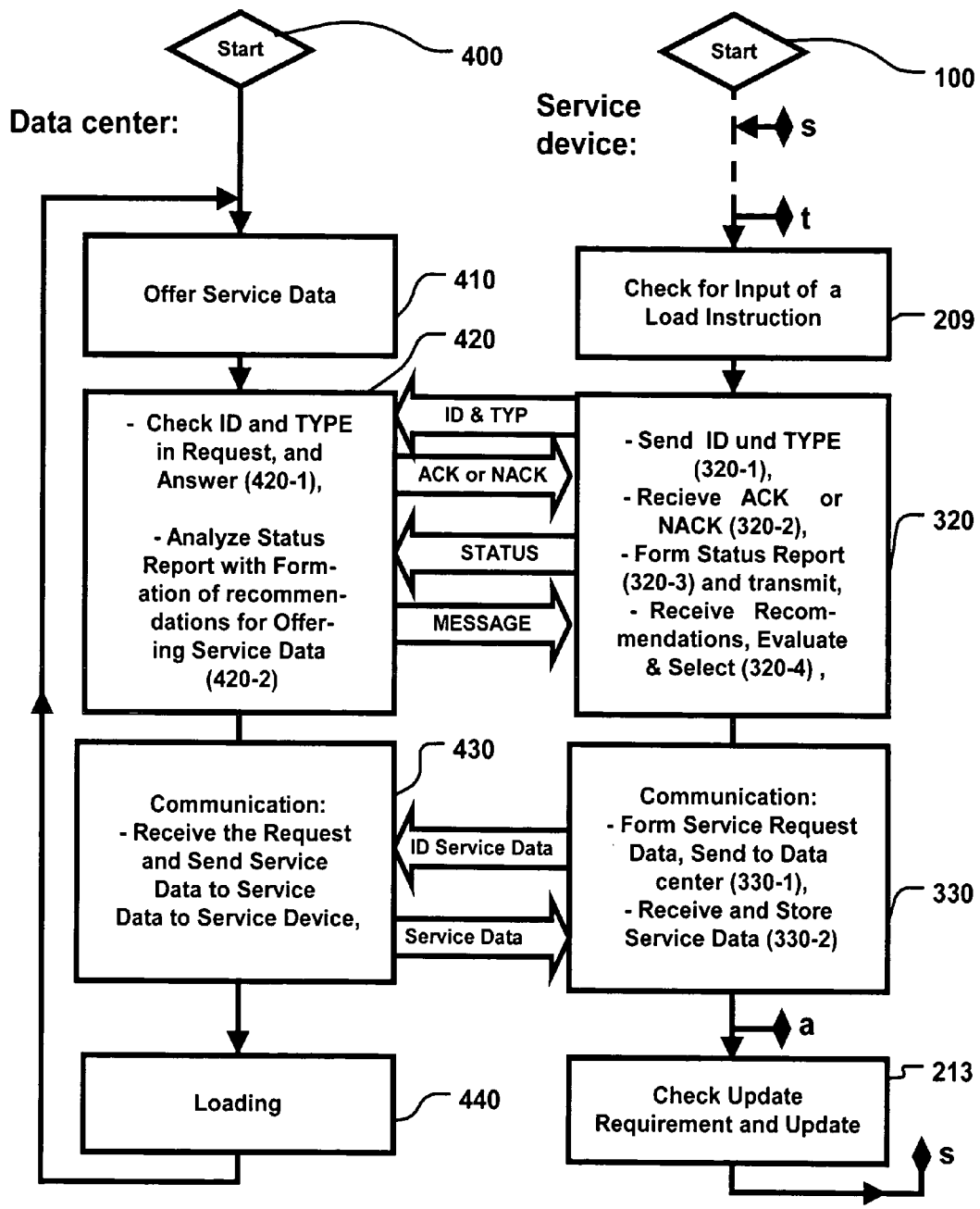
FIG. 3 is a flowchart of the communication mode.

A selective download of individual components of the load system is achieved by setting an entry for table type for identification of a table for the download in the sub-steps shown in FIG. 3 including formation of the status reportin sub-step 320-3, analysis and formation of a list with recommendations of changes in sub-step 420-2, and forming request data in sub-step 330-1. For example, the following types are possible:

rate table display strings (for example, texts for selective imprints or auxiliary texts)

combinations (plausible shipping parameter combinations)

International Database (for example, ISO Table for country code)

etc.

Independently thereof, the communication protocol between service device (client) and server is always composed of the parts:

1. Commencement
2. Status report of the client
3. Recommendations of the server
4. Data transfer.

In a re-assumption of an aborted download, or given download of an explicitly selected table, parts 2 and 3 are eliminated. The continuation of the communication with re-assumption of an aborted download is only possible in the transfer phase. Automatically continuing with further recommendations of the server depends on the possibilities of the service device (client), such as whether the service device can store the recommendations. The download is continued after the most recent successfully received byte.

Figure 4:
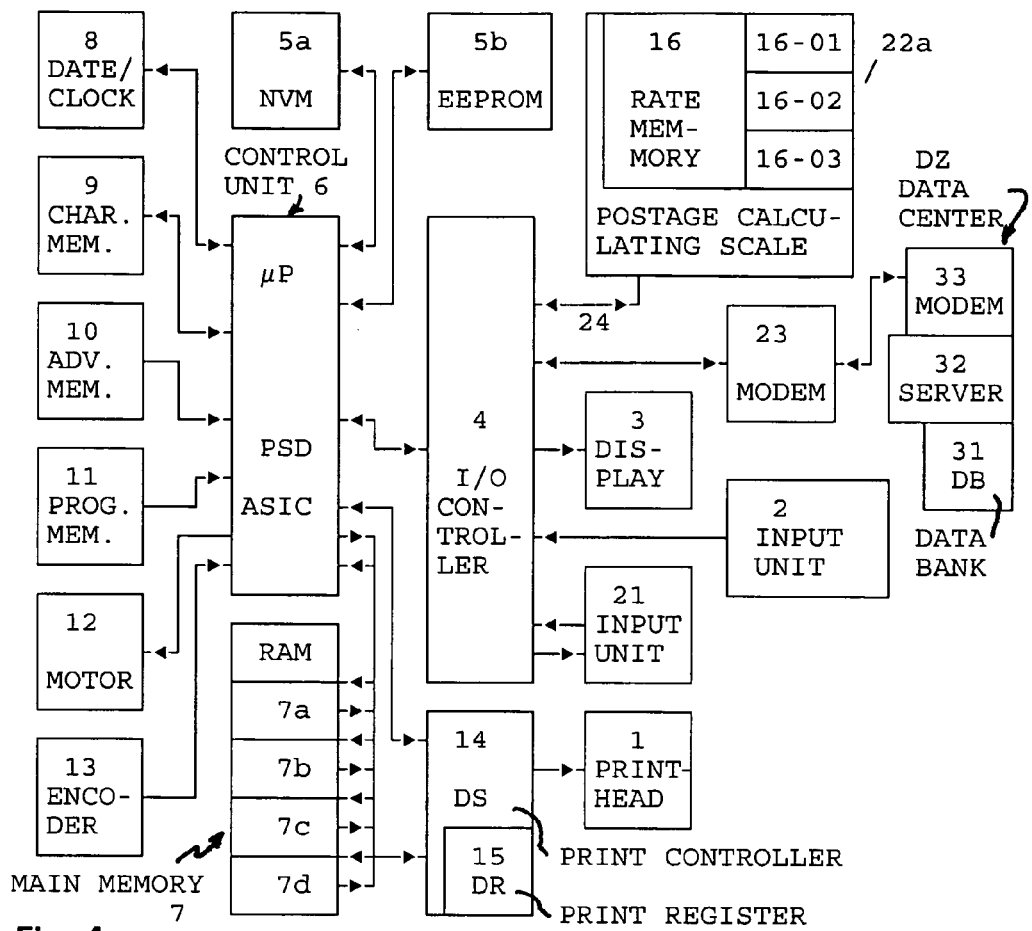
FIG. 4 is a block circuit diagram of a postage meter machine with connection to a postage calculating scale, the postage calculating scale being programmable and operable, together with the postage meter machine, in accordance with the invention.

FIG. 4 shows a block circuit diagram of the electronic postage meter machine for a version having a postage-calculating scale 22a. The postage-calculating scale 22a is connected via its serial RS 232 interface to a serial RS 232 interface (not shown in detail) of the input/output control module 4 via a connecting path 24. The scale 22a can then use the modem 23 of the postage meter machine for communication with the data center DZ.

In this exemplary embodiment, the postage computer is integrated into the scale 22a in order to determine the postage value and in order to then communicate the postage value to the postage meter machine. In A modified flowchart (not shown) corresponding to the flowchart shown in FIG. 2, of course, the step 220 of the internal postage-calculating mode of the postage meter machine is eliminated.

The mail processing system can BE a postage meter machine and a scale such as, for example, the known scale T1000 system of Francotyp Postalia AG & Co with its microprocessor programmed in accordance with the invention. In order to equip a number of postal customers with a fee schedule table in time, which becomes current beginning with a conversion date, a loading of the table to take effect in the future ensues in advance.

For example, a method for secure transmission of service data to terminal equipment is employed in such a service data loading, such as disclosed in German Application 198 30 055.7 (corresponding to co-pending U.S. application Ser. No. 09/340,782, "Method for the Dependable Transmission of Service Data to a Terminal Equipment and Arrangement for Implementing the Method," Reisinger, assigned to the same assignee, Francotyp-Postalia AG & Co., as the present application) which includes the following method steps: after offering new service data in the data center for a future processing based on the service data, a formation of request data for service data ensues by the terminal equipment before the communication of the terminal equipment with a data center. The communication has a sending the request data in order to request the new service data from the data service and a reception and intermediate storage of the requested service data at the data center DZ.

An actuated trigger key 45 of the scale 22a can trigger a pre-loading of the table to take effect in future without updating the existing, second table of the same mail carrier.

A date for when the table takes effect must be stored allocated for each table version. The check as to whether the table is to be put into effect can continue to ensue within the postage meter machine because it already contains a clock/date module 8.

Differing from the mail processing system according to European Application 724 141, a long communication with a remote server is avoided and a conversion event does not ensue during the communication every time the machine is switched on given the inventive system. On the contrary, the actuated trigger key 45 of the scale 22a can trigger an on-demand loading of the table to take affect in the future before the conversion event occurs. The conversion event itself is not noticed by the user because it automatically sequences offset in time and separated from the on-demand loading on the conversion date and, thereby sequences relatively fast.

Figure 5:
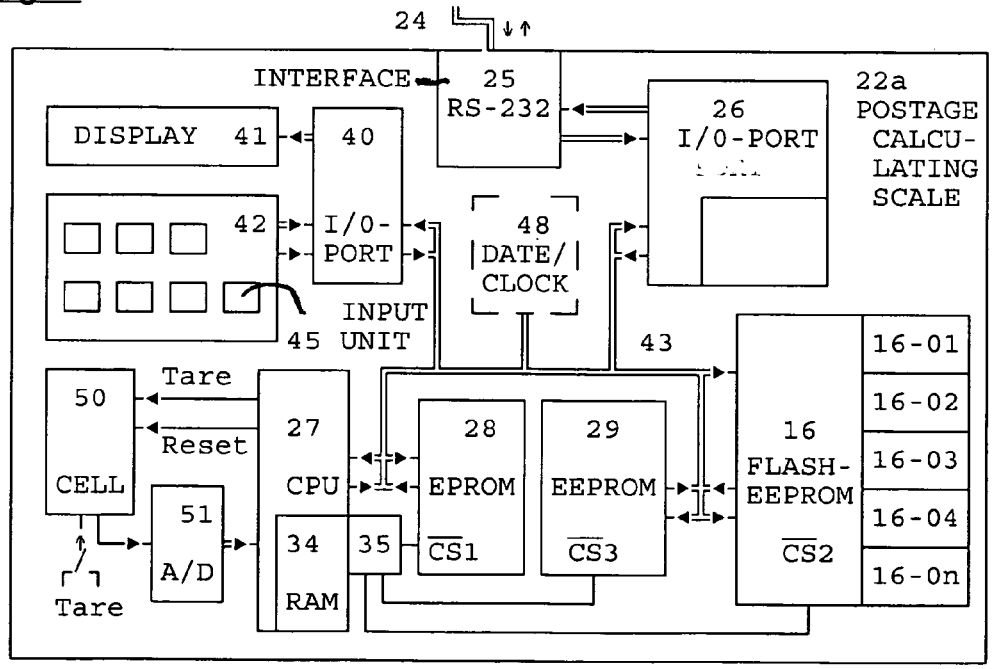
FIG. 5 is a block circuit diagram of the postage calculating scale in the embodiment of FIG. 4.

FIG. 5 shows a block circuit diagram of a postage computer scale that is connected to the postage meter machine of FIG. 1b via a serial interface. An input/output port 26 is connected to the RS232 interface 25 of the scale 22a, this port 26 being in communication with the internal bus 43 with the processor 27 of the scale 22a. Such a bus includes data, address and control lines.

The scale has an input unit 42, such as a keyboard, and an output unit 41 that are connected via an I/O port 40 to the processor 27 and also has a memory 28 connected to the processor 27 via the internal bus 43 for storing the operating software of the scale, a memory 29 for storing application data (for example, selective impression numbers), and a memory 16 for storing the loaded service data (for example, the postage fee schedule tables). A weighing cell 50 is connected via an A/D converter 51 to the processor 27 for determining the weight and, moreover, direct connections serve for resetting or calibrating the weighing cell 50 with the processor 27. More detail can be obtained from U.S. Pat. No. 5,710,706 (corresponding to European Application 724 141). Optionally, a battery-supported calendar module 48—shown with broken lines—can be integrated into the scale 22a, connected to the internal bus 43. All necessary inputs are undertaken via the input unit 42. Important information such as, for example, the weight of the postal item and the postage calculated with reference to the postage fee schedule table are output at the display 41. When a modified postage fee schedule table is required in the electronic postage calculator, a reloading can ensue on demand. To that end, the key 45 is actuated in order to trigger the loading event, and a corresponding display appears on the display 41. The actuated key 45 triggers a switching into the loading mode but does not yet trigger an updating mode. The fee schedule memory 16 and the processor 27 here are components of the postage computer of the postage-calculating scale 22a. When the scale 22a is switched into the loading mode, various service data and, in particular, the postage fee schedule tables that are to be entirely or partially modified, can be loaded.

In this embodiment, the postage-calculating scale 22a is the service device that forms a status report of the memory occupancy by service data of various rate tables and communicates this to the data center DZ and that, when evaluating recommendations for a future status of the memory occupancy, automatically implements the selection from a number of proposals. In the analysis of the status report of the memory occupancy for service data of the postage-calculating scale 22a implemented by the data center DZ, a list with proposals is produced and sent back to the postage-calculating scale 22a. Inventively, the most meaningful proposal has the highest priority and is correspondingly identified in the list. This preferably ensues with a numbering.

In a preferred embodiment, the proposal listed first has the highest priority, and the selection by the service device (scale 22a) from a number of proposals for a subsequent loading of the service data ensues automatically corresponding to the highest priority. After the aforementioned loading of the first service data, the proposal previously listed second in the list now has the highest priority for a subsequent loading of further service data, etc. The processor 27 is appropriately programmed such that the proposal that is listed first is automatically selected.

When the service device includes a postage computer, then the service data are at least one postage fee schedule table. The processor 27 is programmed for input of a conversion request when loading as well as for checking the conversion request and for converting to the current, new postage fee schedule table when the conversion requirement is met or switching into the operating mode when the conversion requirement is not met.

For example, a conversion date is a conversion requirement. In addition to loading new postage fee schedule data into the aforementioned first area 16-01 of the memory of the postage computer, thus, it is provided that a loading of an appertaining conversion date ensues into a third area 16-03 of the memory of the postage computer. As is known, the postage meter machine contains a calendar module and automatically communicates the currently valid date to the postage computer at least once, for example given the initial turn-on at the start of the date. The communicated date is compared to the aforementioned conversion date in the postage computer.

It is advantageous in conjunction with the inventive method for data input into a postage computer that an automatic updating is implemented independently of and separated in time from the aforementioned loading, whereby postage fee schedule data from the first memory area 16-01 are transferred into the second memory area 16-02 of the postage computer. The updating can ensue at an arbitrary, later conversion date. The processor 27 of the postage computer then implements a writing of data for updating the postage fee schedule table into the second memory area 16-02 provided for this purpose. The first memory area 16-01 is then free for a future loading of service data. At least one first memory area and second memory area are provided in the rate memory 16 of the postage computer, whereby the second memory area stores the postage fee table data of the rate table which are valid at the time and the first memory area is provided for postage fee schedule data of the new rate table to be valid in the future after the conversion date.

It is also provided that the postage fee schedule tables or service data are compressed during loading and what is now the current, new postage fee schedule data or current service data are decompressed during the conversion.

The processor 27 is thus programmed to check the stored conversion date on the basis of the current date and to continue processing with the old postage fee schedule table data when the current date falls short of the conversion date and to update the postage fee schedule table data when the current date is equal to or exceeds the conversion date. In other words, the automatic updating is suppressed when the current date falls short of the conversion date, however, the automatic updating is undertaken when the current date is higher than or equal to the conversion date. A communication of the date to the postage computer is thereby preceded by the step of the postage computer automatically requesting the currently valid date from the calendar module. The latter ensues, for example, upon the initial activation at the start of each day. The calendar module can be a component of the scale and/or the postage meter machine. During loading, data can be loaded into various devices of the system. The loading of new postage fee schedule data can ensue into a first area of the memory of the postage computer, and the loading of a future conversion date can ensue into a second area of the memory of the postage meter machine.

Inventively, a storage of information also ensues in a fourth memory area of the postage computer for new postage fee schedule data available in the data center, this information, for example, being a load code or a carrier-associated version number.

The following steps are executed:
providing information that new postage fee schedule data are available in the data center;
communication of the information from the data center via the postage meter machine to the postage computer;
storing the information in the fourth memory area 16-04 for the postage computer for new postage fee schedule table data available in the data center;
checking in the postage computer on the basis of the stored information for input of a load code correspondingly appertaining to the information that was entered by an input unit;
mode switching to a load mode with selection of a free, first memory area in the postage computer when the load code has a predetermined relationship to the information, and loading compressed, new postage fee schedule table data belonging to the information and an appertaining conversion date dependent on the check in the postage computer before the automatic updating.

In one embodiment, the invention provides for loading of new postage fee schedule table data belonging to the information into a first area of a memory of the postage meter machine, with a copying into the memory of the postage computer subsequently ensuing. An appertaining conversion date is loaded into a second area of the memory of the postage meter machine, followed by a subsequent copying into the memory of the postage computer, whereby the conversion date in the second area of the memory of the postage meter machine is deleted. Given every first transmission of weight or postage value data from the postage computer, the postage meter machine is informed of the stored conversion date for that carrier that was set for the postage computer.

In a further embodiment having a postage computer in a scale, the invention provides that the postage computer in the scale undertakes a selective deletion of memory areas in the scale before the loading of compressed, new postage fee schedule table data. For updating the postage fee schedule table data, the postage computer then implements a decompression of the loaded, new postage fee schedule table data and write-in of decompressed data, whereby postage fee schedule table data from the first memory area decompressed and written into the second memory area of the scale. This makes it possible for the automatic updating to ensue at an arbitrary, later conversion date independently of and separated in time from the loading.

In one version an automatic unit forms request data in order to be able to access current tables when the point in time for new postage fee schedule table data has approached. This automatic unit operates dependent on the carrier that has been set and on the date supplied by the clock/date module 8 of the postage meter machine. The automatic unit can be realized in the postage computer and/or in the memory cells of the clock/date module 8.

The postage computer can be integrated into a postage-calculating scale 22a that is connected by interface to the postage meter machine. It is also possible that the system including the postage computer is a postage meter machine. This, however, is not intended to exclude the case that the postage computer in the system is realized separately from the postage meter machine and/or scale and is connected to the latter by interface.

Although modifications and changes may be suggested by those skilled in the art, it is the intention of the inventors to embody within the patent warranted hereon all changes and modifications as reasonably and properly come within the scope of their contribution to the art.

The invention claimed is:

1. A method for input of new service data into a service device, said new service data being available at a data center located remotely from said service device, comprising the steps of:
providing a memory for service data in a service device and forming in said service device, a status report of memory location occupancy by existing service data in said memory comprising a designation of available bytes in said memory;
establishing a communication between said service device and said data center and transmitting said status report from said service device to said data center;
based on said status report and the new service data available at said data center, forming recommendations in said data center for a future memory location occupancy in said service device, each recommendation designating a different memory location to be occupied by said new service data;
communicating a message from said data center to said service device containing said recommendations;
upon receipt of said message at said service device, checking said recommendations in said service device for feasibility as to memory location occupancy in said memory; and
loading said new service data available at said data center into said memory of said service device at a memory location according to one of said recommendations that has been checked to be feasible.

2. A method as claimed in claim 1,
wherein the step of providing a memory comprises providing said memory with at least one of a plurality of first memory areas in which said new service data which will be valid in the future, starting from a conversion date, are to be stored, and a second memory area in which said existing service data are stored;
wherein the step of forming recommendations comprises recommending storage of said new service data in at least one of said first memory areas, and wherein the step of checking said recommendations comprises conducting a check, in said service device, as to the feasibility of storing said new service data in at least one of said first memory areas;
and wherein said method further comprises forming request data in said service device, requesting said new service data, if said check indicates feasibility of storing said new service data in at least one of said first memory areas and transmitting said request data to said data center, and forming an error message if said check indicates non-feasibility of storing said new service data in any of said first memory areas and transmitting said error message to said data center;

and wherein the step of loading said new service data comprises, upon receipt of said request data at said data center, transmitting said new service data from said data center to said service device and loading said new service data into said one of said first memory areas together with said conversion date; and automatically updating said existing service device independently of and separated in time from loading said new service data, by transferring said new service data from said one of said first memory areas into said second memory area at said conversion date.

3. A method as claimed in claim 2 wherein said new service data available at said data center comprise a plurality of data tables, each data table having a table type and a table description associated therewith, and wherein the step of forming said request data comprises forming request data including one of said table types and one of said table descriptions, and wherein the step of forming said recommendations at said data center comprises forming said recommendations in a sequence dependent on the table type and table description contained in said request data and wherein the step of conducting a check comprises checking said recommendations for feasibility in an order determined by said sequence and wherein the step of selecting one of said first memory areas comprises selecting one of said first memory areas recommended in a first of said recommendations in said sequence which is found to be feasible, and wherein the step of loading said new service data comprises selectively loading, at a first point in time, at least the data table, and its associated conversion date, corresponding to the recommendation first found to be feasible in said check, and wherein the step of automatically updating said service device comprises periodically determining whether a current date precedes, equals or follows said conversion date and automatically updating said existing service data if said current date equals or follows said conversion date and continuing operation of said service device with the existing service data currently stored in said second memory area if said current date precedes said conversion date.

4. A method as claimed in claim 3 wherein the step of providing a memory comprises providing a memory in said service device with a third memory area and wherein the step of loading said new service data comprises loading said conversion date into said third memory area and wherein the step of automatically updating said existing service data comprises providing an electronic calendar module in said service device which continuously emits a signal identifying said current date, and periodically comparing said conversion date in said third memory area with said signal from said calendar module.

5. A method as claimed in claim 3 comprising the additional step of providing a calendar module in said service device which emits a signal identifying said current date, and wherein the step of automatic updating comprises automatically requesting said current date from said calendar module.

6. A method as claimed in claim 3 comprising loading said conversion date into a separate memory area of said memory of said service device, separate from said first memory area.

7. A method as claimed in claim 3 wherein said service data comprise postage fee schedule table data, and comprising the additional steps of:

providing a postage calculator in said service device which calculates a franking value using said postage fee schedule table data;

providing a further memory area in said memory of said service device;

communicating from said data center to said service device information about new postage fee schedule table data available at said data center and making an entry in said further memory area dependent on said information;

generating a load code in said postage calculator and checking if and when said load code has a predetermined relationship to said entry in said further memory area;

switching to a load mode and loading said new postage fee schedule table data into said one of said first memory areas if and when said predetermined relationship exists.

8. A method as claimed in claim 7 wherein the step of communicating information comprises communicating information from said data center about said new postage fee schedule table data comprising a plurality of proposals in a list.

9. A method as claimed in claim 8 comprising listing a most meaningful proposal first in said list.

10. A method as claimed in claim 1 wherein the step of loading said new service data includes compressing said new service data.

11. An arrangement for input of new service data into a service device, said new service data being available at a data center located remotely from said service device, comprising:

a service device having a memory for existing service data, a computer which forms a status report of memory location occupancy by said existing service data in said memory comprising a designation of available bytes in said memory;

means for establishing a communication between said service device and said data center and for transmitting said status report from said service device to said data center;

means for forming recommendations in said data center, based on said status report and the service data available at said data center, for a future memory location occupancy in said service device, each recommendation designating a different memory location to be occupied by said new service data;

means for communicating a message from said data center to said service device containing said recommendations;

upon receipt of said message at said service device, said computer checking said recommendations in said service device for feasibility as to memory location occupancy in said memory;

said computer loading said new service data available at said data center into said memory of said service device at a memory location according to one of said recommendations that has been checked to be feasible; and means in said service device for triggering updating of said existing service data in said memory, using said new service data, at a time separated from loading of said new service data into said memory.

12. An arrangement as claimed in claim 11, wherein said memory comprises a plurality of first memory areas in which said new service data which will be valid in the future, starting from a conversion date, are to be stored, and a second memory area in which said existing service data are stored;

wherein said means for forming recommendations comprises means for recommending storage of said new service data in at least one of said first memory areas;

wherein said computer checks said recommendations by conducting a check, in said service device, as to the feasibility of storing said new service data in at least one of said first memory areas;

said computer forming request data in said service device, requesting said service data, if said check indicates feasibility of storing said new service data in at least one of said first memory areas and transmitting said request data to said data center, and forming an error message if said check indicates non-feasibility of storing said new service data in any of said first memory areas and transmitting said error message to said data center;

said computer, upon receipt of said request data at said data center, transmitting said new service data from said data center to said service device and loading said new service data into said one of said first memory areas together with said conversion date; and said computer automatically updating said existing service data independently of and separated in time from loading said new service data, by transferring said new service data from said one of said first memory areas into said second memory area at said conversion date.

13. An arrangement as claimed in claim 12 wherein said new service data available at said data center comprise a plurality of data tables, each data table having a table type and a table description associated therewith, and wherein said computer forms said request data comprises forming request data including one of said table types and one of said table descriptions, and wherein said means for forming said recommendations at said data center forms said recommendations in a sequence dependent on the table type and table description contained in said request data, and wherein said computer conducts said check by checking said recommendations for feasibility in an order determined by said sequence and selects one of said first memory areas which is in recommended in a first of said recommendations in said sequence which is found to be feasible, and selectively loads, at a first point in time, at least the data table, and its associated conversion date, corresponding to the recommendation first found to be feasible in said check, and automatically updates said service device if a current date precedes, equals or follows said conversion date and automatically continues operation of said existing service device with the service data currently stored in said second memory area if said current date precedes said conversion date.

14. An arrangement as claimed in claim 13 wherein said memory has a third memory area and wherein said computer loads said conversion date into said third memory area, and said service device comprises an electronic calendar module which continuously emits a signal identifying said current date, said computer periodically comparing said conversion date in said third memory area with said signal from said calendar module.

15. An arrangement as claimed in claim 13 wherein said service device comprises a calendar module which emits a signal identifying said current date, and wherein said computer automatically requests said current date from said calendar module.

16. An arrangement as claimed in claim 13 wherein said computer loads said conversion date into a separate memory area of said memory of said service device, separate from said first memory area.

17. An arrangement as claimed in claim 13 wherein said new service data comprise postage fee schedule table data, and said arrangement comprising:

a postage calculator in said service device which calculates a franking value using said postage fee schedule table data;

a further memory area in said memory of said device;

means for communicating from said data center to said service device information about new postage fee schedule table data available at said data center and for making an entry in said further memory area dependent on said information;

said postage calculator generating a load code and checking, and informing said computer, if and when said load code has a predetermined relationship to said entry in said further memory area; and said computer switching to a load mode and loading said new postage fee schedule table data into said one of said first memory areas if and when said predetermined relationship exists.

18. An arrangement as claimed in claim 17 wherein said means for information communicates information from said data center about said new postage fee schedule table data comprising a plurality of proposals in a list.

19. An arrangement as claimed in claim 18 wherein said means for communicating information lists a most meaningful proposal first in said list.

20. An arrangement as claimed in claim 11 comprising means compressing said new service data.

* * * * *